United States Patent
Ben Ami et al.

(10) Patent No.: US 10,009,807 B2
(45) Date of Patent: Jun. 26, 2018

(54) RADIO ACCESS TECHNOLOGY THRESHOLD ADJUSTMENT

(71) Applicant: Cisco Technology, Inc., San Jose, CA (US)

(72) Inventors: Alon Ben Ami, Gedera (IL); Shay Laslo-Amit, Kfar Saba (IL)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 14/604,815

(22) Filed: Jan. 26, 2015

(65) Prior Publication Data

US 2016/0219489 A1    Jul. 28, 2016

(51) Int. Cl.
H04W 36/10    (2009.01)
H04W 36/14    (2009.01)
H04W 36/00    (2009.01)

(52) U.S. Cl.
CPC ........ H04W 36/0083 (2013.01); H04W 36/10 (2013.01); H04W 36/14 (2013.01)

(58) Field of Classification Search
CPC ..... H04W 36/00–36/30; H04W 36/38; H04W 36/0083
USPC .......................... 455/436–444; 370/331–333
See application file for complete search history.

(56) References Cited

U.S. PATENT DOCUMENTS

| | | | | |
|---|---|---|---|---|
| 2009/0209256 A1* | 8/2009 | Nakashima | ....... | H04W 36/0088 455/436 |
| 2010/0208707 A1* | 8/2010 | Hamabe | ................ | H04W 36/30 370/332 |
| 2011/0034179 A1* | 2/2011 | David | ................... | G01S 5/0236 455/456.1 |
| 2011/0176430 A1* | 7/2011 | Zetterberg | .............. | H04L 43/16 370/242 |
| 2013/0153298 A1* | 6/2013 | Pietraski | ................ | G01V 11/00 175/45 |
| 2015/0098387 A1* | 4/2015 | Garg | ..................... | H04W 16/10 370/328 |
| 2015/0318945 A1* | 11/2015 | Abdelmonem | ......... | H04L 5/006 370/329 |
| 2015/0334578 A1* | 11/2015 | Movva | .................. | H04W 24/02 370/241 |

* cited by examiner

Primary Examiner — Kamran Afshar
Assistant Examiner — Nicole Louis-Fils (57) ABSTRACT

In one embodiment a method includes adjusting a handoff threshold for a cell associated with a mobile communication cell controller, where the handoff threshold indicates a threshold according to which mobile communication devices using a primary radio access technology (RAT) in the cell are handed off by the cell controller to a secondary cell controller using a secondary RAT, monitoring at least one performance indicator associated with communication performance in the cell, if the performance indicator is below a lower performance threshold, reversing the adjusting, otherwise, if the performance indicator is below an upper performance threshold, performing corrective action for targeted mobile communication devices whose associated performance is between the upper and lower performance thresholds as per the monitoring, the corrective action including increasing power for connections associated with the targeted mobile communication devices, and handing off to the secondary RAT controller devices whose performance is below the handoff threshold.

19 Claims, 4 Drawing Sheets

RADIO ACCESS TECHNOLOGY THRESHOLD ADJUSTMENT

FIELD OF THE INVENTION

The present invention generally relates to adjusting thresholds for switching between radio access technologies for mobile communications cells.

BACKGROUND OF THE INVENTION

A radio access technology (RAT) is the underlying physical connection method for a radio-based communication network. Well known examples of RATs used by mobile network operators include LTE, UMTS and GSM.

It is not uncommon for a mobile network operator to support more than one RAT concurrently in the same coverage area. Typically, although not necessarily, the support of multiple RATs is necessitated by the need to support legacy communication devices that are not compatible with a more advanced RAT. For example, a UMTS-based communication device may be incompatible with an LTE-based mobile network. Accordingly, even after introducing an LTE-based network, a mobile network operator may continue to operate a UMTS-based network in the same general coverage area in order to support customers that do not own LTE compatible communications devices.

Some communications devices are compatible with multiple RATs. For example, an LTE communication device may be configurable to work with a UMTS-based network. A mobile network operator may therefore use a legacy network, i.e., the UMTS-based network per the previous example, to provide extra capacity for properly configured communication devices in the event that a more advanced network, e.g. an LTE-based network as per the previous example, is unable to provide service for some or all of the communication devices in its coverage area. In such a case, a cell controller in the more advanced network may handoff the communication device to a cell controller associated with the legacy network in the same coverage area.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Overview

A method includes adjusting a handoff threshold for a cell associated with a mobile communication cell controller, where the handoff threshold indicates a threshold according to which mobile communication devices using a primary radio access technology (RAT) in the cell are handed off by the mobile communication cell controller to a secondary cell controller using a secondary RAT, monitoring at least one performance indicator associated with communication performance in the cell, if the performance indicator is below a lower performance threshold, reversing the adjusting, otherwise, if the performance indicator is below an upper performance threshold, performing corrective action for targeted mobile communication devices whose associated performance is between the upper and lower performance thresholds as per the monitoring, where the corrective action includes increasing power for connections associated with the targeted mobile communication devices, and handing off to the secondary RAT mobile communication devices whose associated performance is below the handoff threshold.

Another includes adjusting a handoff threshold for a cell associated with the mobile communication cell controller, where the handoff threshold indicates a threshold according to which for mobile communication devices using a primary radio access technology (RAT) in the cell are handed off by the mobile communication cell controller to a secondary cell controller using a secondary RAT, monitoring at least two performance indicators associated with communication performance in the cell, where one of the at least two performance indicators is a priority performance indicator and at least one of the at least two performance indicators is a non-priority performance indicator, if the priority performance indicator is below a lower priority performance threshold for the priority performance indicator, reversing the adjusting, otherwise, if the priority performance indicator is below an upper priority performance threshold for the priority performance indicator, performing corrective action for targeted mobile communication devices whose associated performance is between the upper and lower priority performance thresholds as per the monitoring, where the corrective action comprises increasing power for connections associated with the targeted mobile communication devices, if the priority performance indicator is below the upper priority performance threshold for the priority performance indicator, and the non-priority performance indicator is below a lower non-priority performance threshold for the priority performance indicator, reversing the adjusting, and handing off to the secondary RAT the mobile communication devices whose associated performance is below the handoff threshold.

DETAILED DESCRIPTION OF EXAMPLE EMBODIMENTS

It will be appreciated that the performance of a given RAT vis-à-vis a given communication device in a given mobile communication cell may be dependent on a variety of factors. Such factors may include, for example, the size of the cell, the number of concurrently connected communication devices, the configuration of the cell controller, the configuration of the currently connected communication devices, local topography, weather conditions, reflections from buildings and/or other cell transmissions, etc. Since at least some of such factors may typically differ from cell to cell, it will be appreciated by those of skill in the art that the conditions under which it may be beneficial for a cell controller in a given mobile communication cell to hand off a client device to a cell controller associated with another RAT may differ from cell to cell. Determining those conditions for each cell in a mobile communication network may therefore entail a series of calculations and/or tests on a cell-by-cell basis.

In order to avoid the use of resources on such calculations and tests, mobile communication operators commonly set one or more uniform standards for the conditions under which mobile communication devices are handed off to be serviced by a different RAT, where the uniform standard is typically calculated such that RAT handoffs across the network start early enough to prevent the loss or degradation of service for most or all of the connected communication devices. Some mobile communication network operators may employ a single such uniform standard for an entire mobile network. Alternatively, some mobile communication network operators may employ such uniform standards on a segmented basis, e.g. one uniform standard for "rural" cells which typically service fewer subscribers in larger coverage areas, and one uniform standard for urban cells which typically service larger numbers of subscribers in relatively smaller coverage areas.

The uniform standard is typically set as a threshold for a minimum quality of service to be provided by each of the network's cells using a preferred, or primary, RAT. For example, reference signal received quality (RSRQ) may be employed as a proxy indicator for the quality of service received by a given connected communication device. The threshold may therefore be set for an RSRQ value as reported by connected mobile communication devices. In such a case, a connected mobile communication device that calculates an RSRQ value below the threshold, i.e., that detects an unacceptable level of quality of signal, would be handed off from the primary RAT to a legacy, or secondary, RAT serving the same coverage area.

Alternatively, reference signal received power (RSRP) may be employed as a proxy indicator for the quality of service received by a given connected communication device. The threshold may therefore be set for an RSRP value as reported by connected mobile communication devices. In such a case, a connected mobile communication device that calculates an RSRP value below the threshold, i.e., that detects an unacceptable strength of signal, would be handed off to a legacy, or secondary, RAT serving the same coverage area. It will be appreciated by one of skill in the art that other proxy indicators or indices for quality of service may be used in similar manner to establish a threshold for handing off mobile communication devices from a primary RAT to a legacy, or secondary, RAT.

It will be appreciated by one of ordinary skill in the art that the use of a uniform standard for threshold capacity in the cells of a mobile communication network entails a certain tradeoff between the maintenance of continuous uninterrupted service and the level of the service that is ultimately provided. Setting the uniform standard such that handoffs are more frequent may generally be expected to entail a lower level of service for a greater number of communication devices now presumably using a less sophisticated, legacy RAT. Conversely, setting the uniform standard such that handoffs are less frequent, may generally be expected to result in a higher level of service for a lower number of communication devices.

Figure 1:
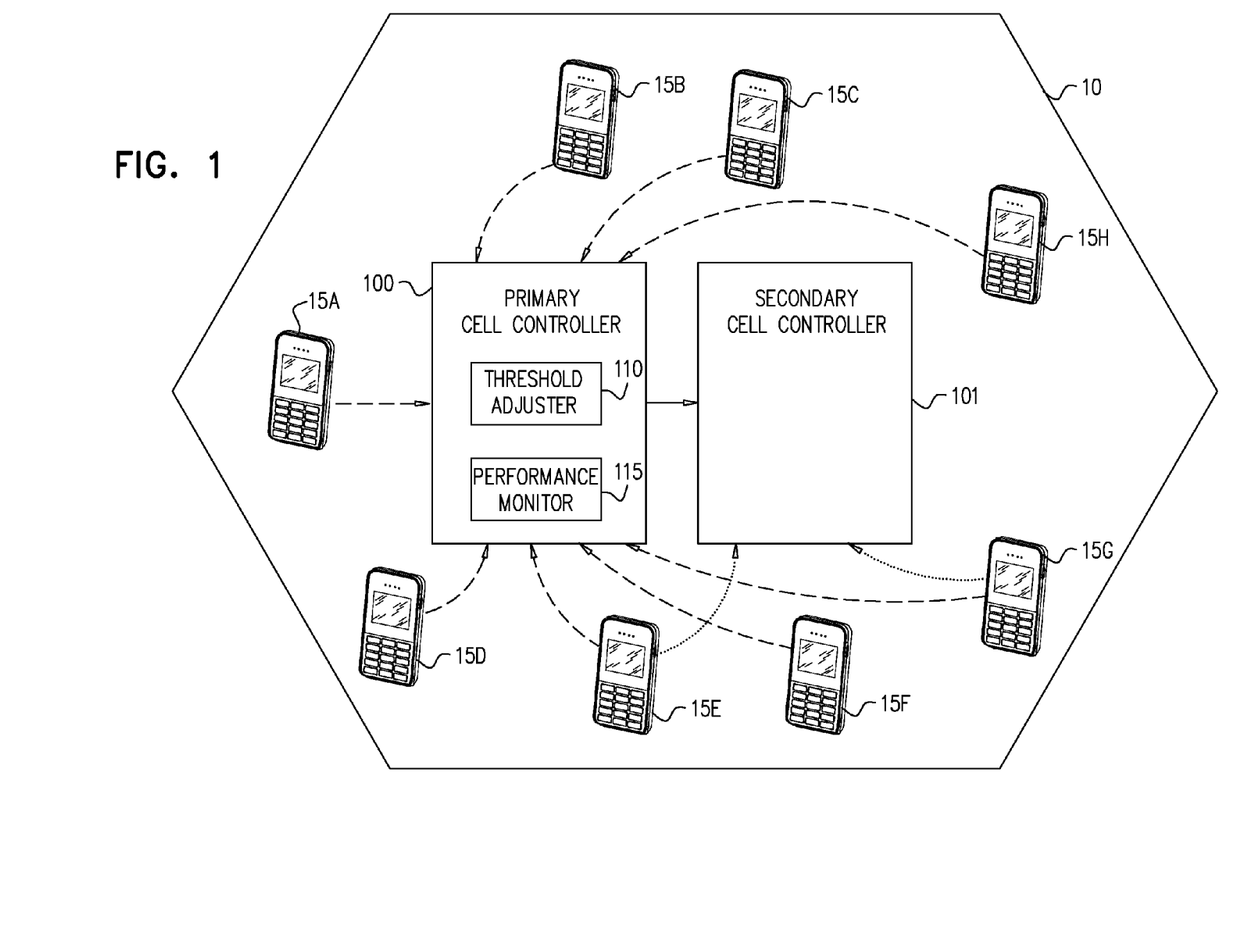
FIG. 1 is a pictorial illustration of a primary cell controller and a secondary cell controller, configured and operative in accordance with embodiments of the disclosure.

Configuring the individual cell controllers to autonomously calculate the threshold limit for each cell may generally improve on the results provided through use of the uniform standard. Reference is now made to FIG. 1, which depicts primary cell controller 100 and secondary cell controller 101, arrayed in mobile communication cell 10 and configured and operative in accordance with an exemplary embodiment. Primary cell controller 100 may provide connectivity within cell 10 for mobile communication devices 15 using a primary, or preferred, RAT. For example, primary cell controller 100 may be a mobile management entity (MME) configured to provide connectivity services to mobile communication devices 15 using the LTE RAT in cell 10. As depicted in the exemplary embodiment of FIG. 1, mobile communication devices 15A-H may be compatible with the RAT services by primary cell controller 100, i.e., as per the above example, they may be LTE compatible. Accordingly, as indicated by the dashed arrows in FIG. 1, mobile communication devices 15 may connect to the associated mobile communications network via primary cell controller 100.

Secondary cell controller 101 may provide connectivity within cell 10 for mobile communication devices 15 using a secondary, or legacy, RAT. For example, secondary cell controller 101 may be a radio network controller (RNC) configured to provide connectivity services to mobile communication devices 15 using the UMTS RAT in cell 10.

As per the exemplary embodiment of FIG. 1, primary cell controller 100 may comprise the components and functionalities of a typical MME, such as are known in the art. Primary cell controller 100 may also comprise threshold adjuster 110 and performance monitor 115. Threshold adjuster 110 and performance monitor 115 may be implemented as either software applications executed by a processor (not shown), hardware components and/or a combination thereof. As will be discussed hereinbelow, threshold adjuster 110 may be configured to autonomously adjust the threshold(s) according to which primary cell controller 100 may handoff mobile communication device(s) to secondary controller 101. As per the exemplary embodiment of FIG. 1, the threshold(s) as adjusted by threshold adjuster 110 may be set such that primary cell controller 100 may no longer capable of providing service to all of mobile communication devices 15A-H. Accordingly, as indicated by the dotted arrows in FIG. 1, mobile communication devices 15E and 15G may be handed off by primary cell controller 100 to secondary cell controller 101 to be serviced by the secondary RAT, i.e., UMTS as per the example hereinabove.

It will be appreciated by one of ordinary skill in the art that primary cell controller 100 and secondary cell controller 101 may use known methods for handing off mobile communication devices 15E and 15G between themselves. It will similarly be understood that given the circumstances of a given change in the threshold(s) for handing off, known methods may be employed for determining which, if any, of mobile communication devices 15 may be handed of. It will also be appreciated by one of skill in the art that the above example of an LTE RAT handing off to a UMTS RAT is not limiting; embodiments of the disclosure may support other such combinations, such as an LTE RAT handing off to a 3G RAT, a UMTS RAT handing off to a GSM RAT, etc. Furthermore, it will be appreciated that the depiction of the coverage area of mobile communication cell 10 as being identical for both the primary and secondary RAT may be exemplary. Embodiments of the disclosure may support any RAT coverage area overlap scenario, whether or not the underlying coverage areas are identical or not.

Performance monitor 15 may be configured to use known methods for monitoring the service provided by the primary RAT. Accordingly, performance monitor 115 may collate data regarding, for example, concurrent connections, dropped connections, packets lost, total data throughput, services used, etc. Threshold adjuster 110 may use the data collated by performance monitor 101 to determine the effects of changes to the threshold(s) used for handing off to secondary cell controller 101.

Figure 2:
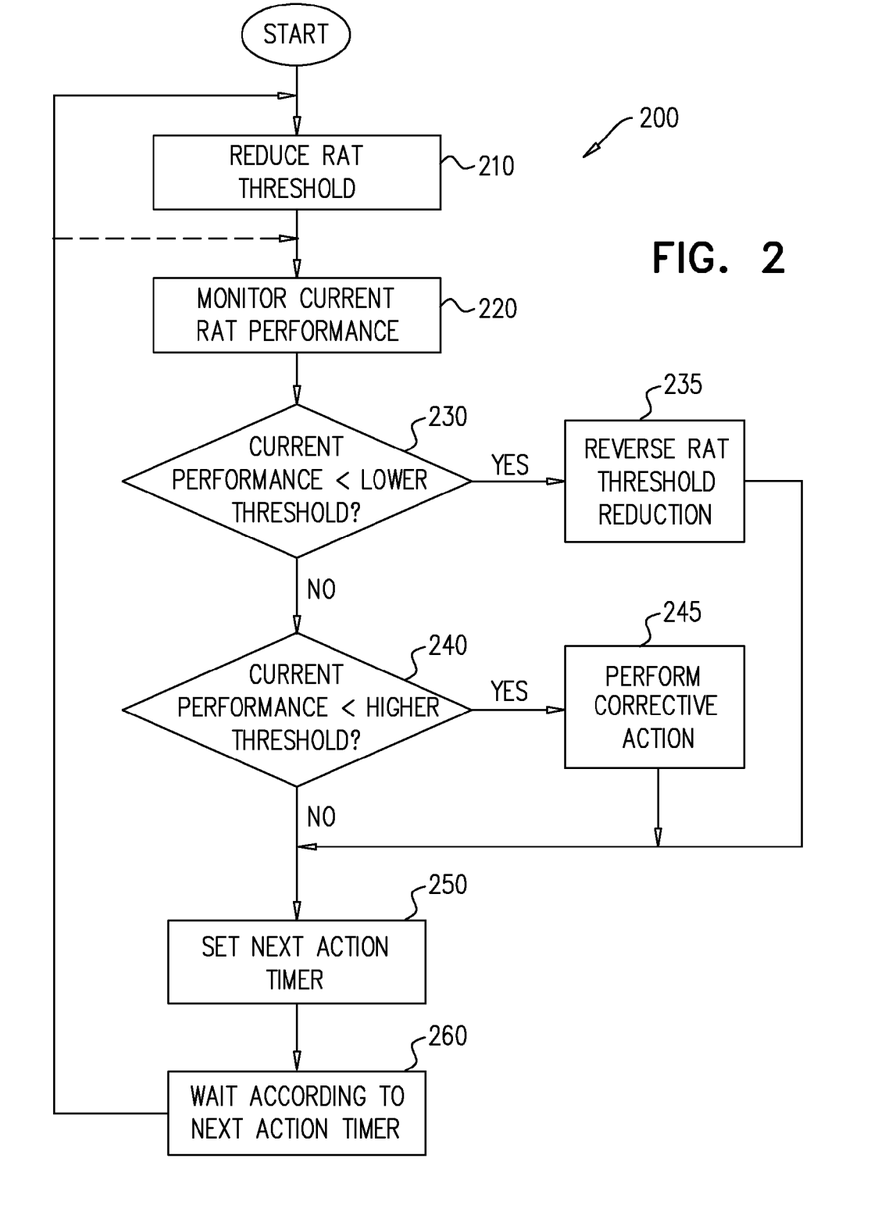
FIGS. 2-4 are flowcharts of RAT threshold adjustment processes to be performed by the primary cell controller of FIG. 1 in accordance with embodiments of the disclosure.

Reference is now also made to FIG. 2 which illustrates a flowchart for a RAT threshold adjustment process 200 to be performed by primary cell controller 100 (FIG. 1). Threshold adjuster 110 reduces (step 210) a RAT handoff threshold, i.e., a threshold according to which more or fewer mobile communications devices 15 are handed off to the secondary RAT. For example, a typical uniform standard for the handoff threshold may be −10 dB; in accordance with an exemplary embodiment, threshold adjuster may reduce the handoff threshold for cell 10 dB to −12 dB.

Performance monitor 115 may monitor (step 220) the effect of the threshold reduction performed in step 210 using a variety of performance indicators or indices including, for example, concurrent connections, dropped connections, packets lost, total data throughput, services used, etc.

Threshold adjuster 110 may use one of the performance indicators or indices monitored by performance monitor 115 to assess the effect of the threshold reduction of step 210. In accordance with an exemplary embodiment, a dropped connection rate as monitored in step 220 may be so designated. It will however be appreciated by a person of skill in the art that the specific performance indicator so designated may be selected from any of the performance indicators or indices monitored by performance monitor 115 and/or otherwise available to threshold adjuster 110.

Threshold adjuster 110 may compare the current performance as monitored by performance monitor 115 to a lower performance threshold (step 230). The lower performance threshold generally indicates an unacceptable level of performance. For example, a drop rate of 3% or more may be considered unacceptable. Therefore if the current drop rate after the threshold adjustment of step 210 meets or exceeds 3%, current performance may be determined to be less than the lower performance threshold, and in response, threshold adjuster 110 may reverse (step 235) the RAT threshold reduction of step 210, i.e., as per the hereinabove example, the threshold may be returned from −12 dB to −10 dB. Threshold adjuster 110 may set (step 250) a timer for the next action to be performed.

If the current performance as monitored by performance monitor 115 is not less than the lower performance threshold, control will flow through from step 230 to step 240. Threshold adjuster 110 may compare the current performance as monitored by performance monitor 115 to a higher performance threshold (step 240). The higher performance threshold generally indicates a problematic, yet nominally acceptable, level of performance. For example, if as per the exemplary embodiment described hereinabove a lower performance threshold may be designated as a drop rate of 3% or more, a higher performance threshold may be designated as 1% or more. Therefore if the current drop rate after the threshold adjustment of step 210 exceeds 1% or more, current performance may be determined to be less than the higher performance threshold.

In response, threshold adjuster 110 may perform (step 245) corrective action for some or all of the mobile communication devices 15 connected to cell 10. For example, cell controller 100 may boost the amount of power used to transmit on frequencies allocated for communication with mobile communication devices 15 that specifically fall in the spectrum between the original handoff threshold and the current, reduced threshold. For example, if, as per the description hereinabove, the handoff threshold was reduced from −10 dB to −12 dB, cell controller 100 may boost transmission power for communication with outlying mobile communication devices 15 reporting between −10 dB and −12 dB. Accordingly, the corrective action may be applied in a discriminatory fashion to the most problematic connections without wasting resources on connections with more satisfactory performance.

It will be appreciated by one of skill in the art that step 220 may be performed over a period of time in order to more accurately gauge the effects of step 210. In accordance with embodiments of the disclosure, the period of time for such monitoring may be configurable. For example, process 200 may be configured such that performance monitor 115 may monitor the effect of the threshold reduction performed in step 210 for one to four hours before proceeding to step 230.

It will also be appreciated by one of skill in the art, that performance monitor 115 may continue to monitor the effect of the threshold reduction performed in step 210 even after process 200 may continue to step 230. As described hereinabove, step 230 entails checking for the need to reverse the threshold reduction of step 210; whereas step 240 entails checking for the need to perform less drastic corrective action. In accordance with embodiments of the disclosure, performance monitor 115 may use different monitoring periods for steps 230 and 240. For example, whereas the monitoring period used to evaluate the condition of step 230 may be configured as at least one to four hours; the monitoring period used to evaluate the condition of step 240 may be configured as at least one to two days.

It will similarly be appreciated that step 230 may be periodically repeated by process 200 before evaluating the condition of step 240. For example, if the monitoring period associated with step 230 is two hours and the monitoring period associated with step 240 is one day, as long as control has not yet flowed through to step 235, the evaluation of the condition of step 230 may be repeated every two hours until one day has elapsed and process 200 may continue to step 240. Such repeat evaluations of the condition of step 230 may use the monitoring data for the most recent monitoring period, i.e., the preceding two hours for a two hour monitoring period, or cumulative data from the point in time that step 210 was most recently performed.

As described hereinabove, threshold adjuster 110 may set (step 250) a timer for the next action to be performed. The length of the timer may be contingent on the results of steps 210 through 245. For example, if the handoff threshold reduction of step 210 was successful, i.e., current performance as monitored in step 220 remained above both the lower and higher performance thresholds; the timer may be set for a day. If the handoff threshold reduction was unsuccessful, i.e., step 235 was performed; the timer may be set for a longer period, such as two days. If corrective action was performed, the timer may be set for a shorter period such as six hours in order to facilitate finer adjustments. It will be appreciated by one of skill in the art that in practice other timer settings may be used and that the settings may be configurable.

Process 200 will then enter a wait state (step 260) as per the timer set in step 250. Control may then return to step 210 and process 200 may continue as before. It will be appreciated by those of skill in the art that process 200 may be optionally configured to return to step 220 from step 260 in order to periodically check the performance of cell 10 without first adjusting the handoff threshold. In such a case, the timer set in step 250 may be for a relatively sorter length, such as, for example, an hour. Process 200 may then periodically return control to step 210 in order to regularly adjust the handoff threshold and assess the impact thereof.

Figure 3:
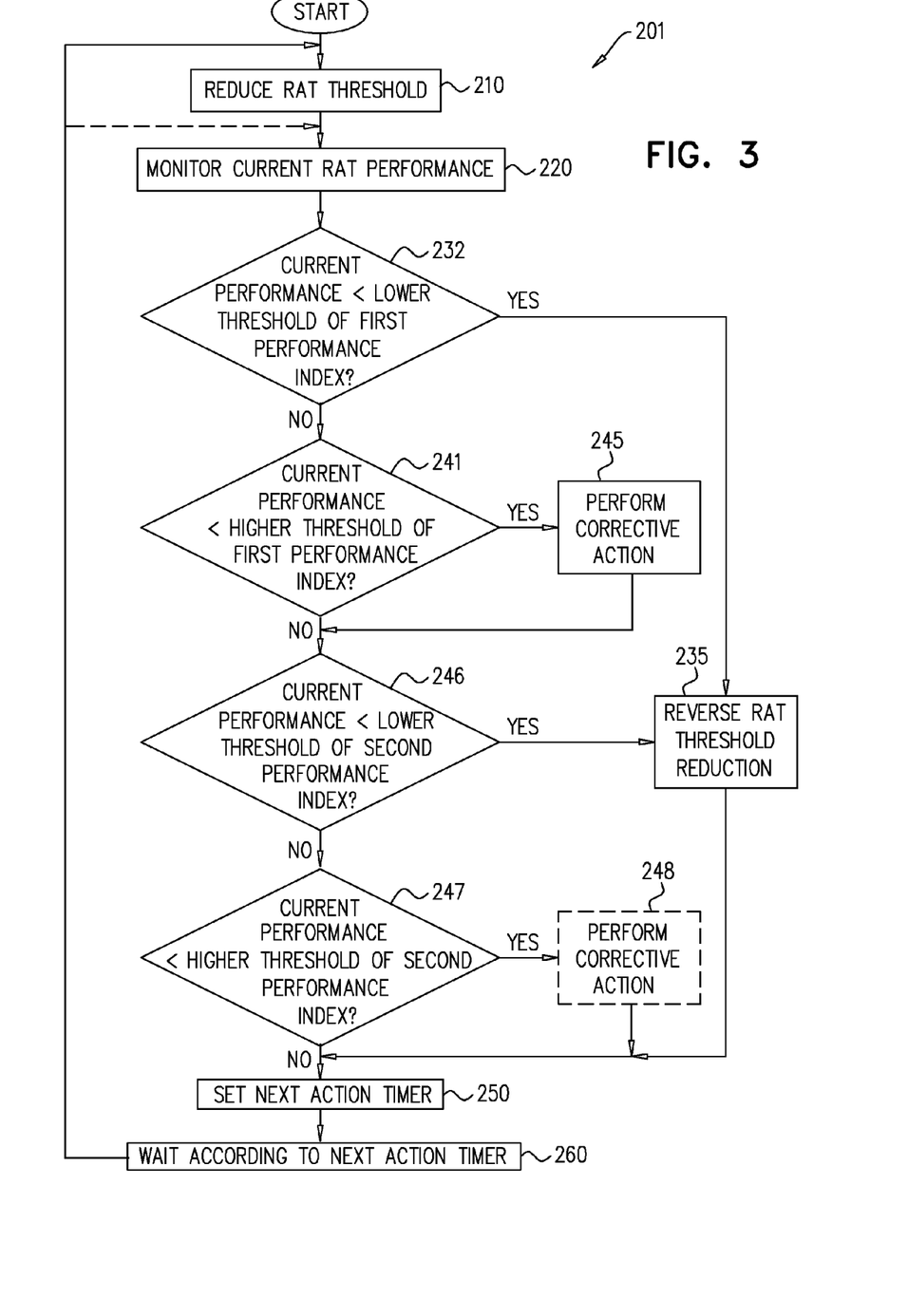

It will be appreciated that multiple performance indicators or indices may be employed to assess the effectiveness of the handoff threshold adjustment performed in step 210. Reference is now made also to FIG. 3 which is a flowchart illustration for an alternative RAT threshold adjustment process 201 to be performed by primary cell controller 100 (FIG. 1). Similar reference numerals refer to similar steps in process 200. Accordingly, steps 210 and 220 may be performed generally as with process 200 (FIG. 2).

Process 201 may differ from process 200 in that process 201 is configured to assess the effects of a handoff threshold adjustment as performed in step 210 in light of two performance indicators or indices, instead of the single performance indicator or index used in process 200. Accordingly, steps 232 and 241 may be generally functionally analogous to steps 230 and 240 of process 200; threshold adjustor 110 may assess the effects of a handoff threshold adjustment as performed in step 210. However, steps 232 and 241 may be associated with the first of two performance indicators or indices, such as the connection drop rate per the example presented in the context of FIG. 2.

Steps 246 and 247 may also be generally functionally analogous to steps 230 and 240. However, steps 232 and 241 may be associated with the second of two performance indicators or indices, such as, for example, packet loss rate.

Accordingly, after step 220 is performed, threshold adjuster 110 may compare the current performance as monitored by performance monitor 115 to a lower performance threshold for a first performance index (step 232). If the current performance is determined to be less than the lower performance threshold, threshold adjuster 110 may reverse (step 235) the RAT threshold reduction of step 210, and process 201 may continue to step 250.

If the current performance is determined to be less than the lower performance threshold, threshold adjuster 110 may then compare the current performance as monitored by performance monitor 115 to a higher performance threshold for the first performance index (step 240). If the current performance is determined to be less than the higher performance threshold, threshold adjuster 110 may perform (step 245) corrective action for some or all of the mobile communication devices 15 connected to cell 10.

If step 235 has not been performed, i.e., current performance at least exceeds the lower performance threshold of the first performance index; process 201 may continue processing to assess the effect of the handoff threshold adjustment on the second performance index, e.g. packet loss rate as per the example hereinabove.

Threshold adjuster 110 may compare the current performance as monitored by performance monitor 115 to a lower performance threshold for the second performance index (step 246). If the current performance is determined to be less than the lower performance threshold, threshold adjuster 110 may reverse (step 235) the RAT threshold reduction of step 210, and process 201 may continue to step 250.

If the current performance is determined to be less than the lower performance threshold of the second performance index, threshold adjuster 110 may then compare the current performance as monitored by performance monitor 115 to a higher performance threshold for the second performance index (step 247). If the current performance is determined to be less than the higher performance threshold, threshold adjuster 110 may perform (step 248) corrective action for some or all of the mobile communication devices 15 connected to cell 10. It will, however, be appreciated that if step 245 has already been performed in context with the first performance index, it may not be necessary to perform step 248. Steps 250 and 260 may be generally similar to the similarly referenced steps in process 200.

Figure 4:
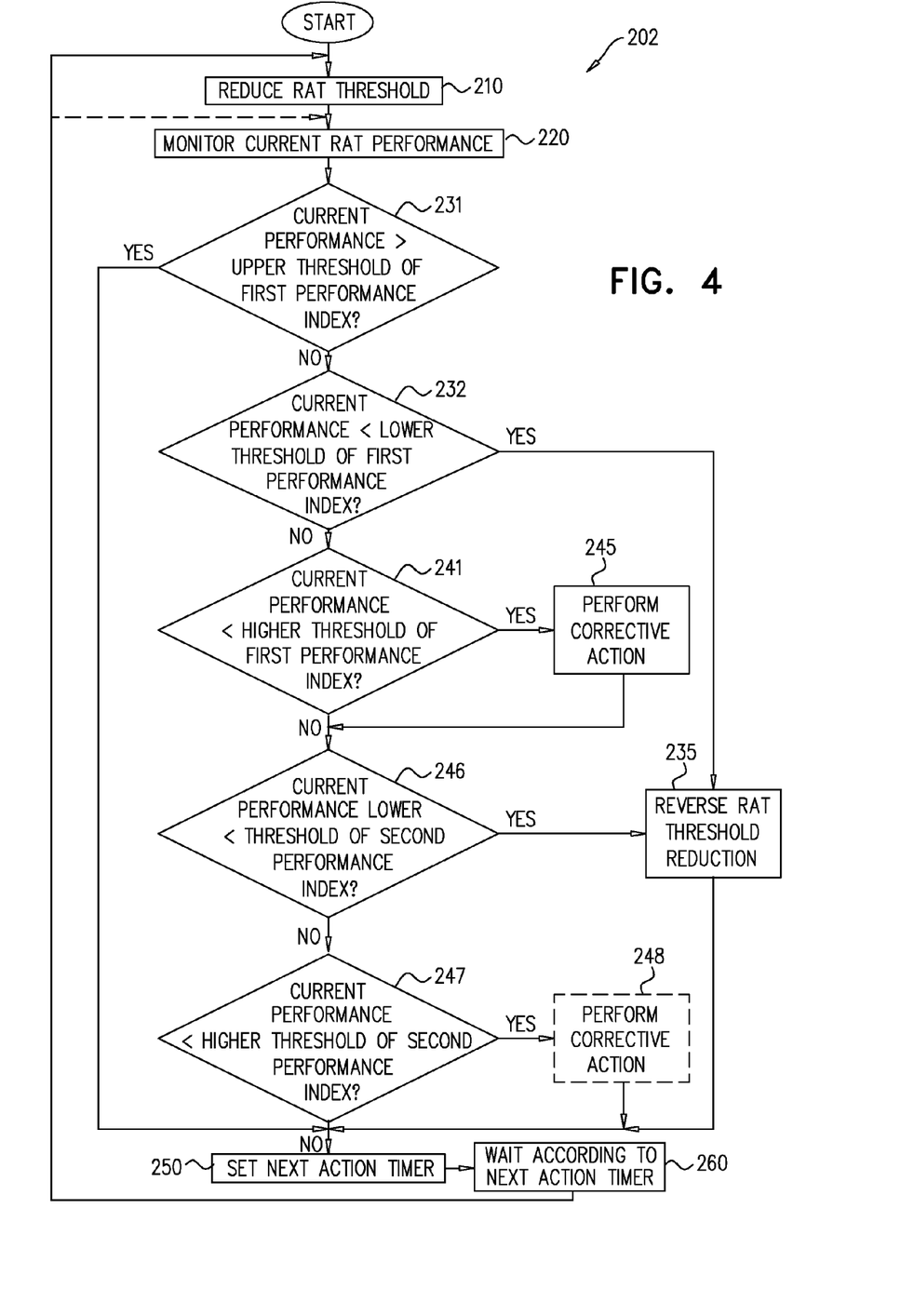

Reference is now made to FIG. 4 which is a flowchart illustration for an alternative RAT threshold adjustment process 202 to be performed by primary cell controller 100 (FIG. 1). Similar reference numerals refer to similar steps in processes 200 and/or 201 and accordingly, may refer to generally functionally similar steps in process 202.

It will be appreciated that it may be preferable to assign different priorities to the different performance indicators or indices that may be used to assess the effects of handoff threshold reduction. It is conceivable that for whatever reason, the operator of cell 10 may determine that as long as a certain performance indicator or index exceeds a certain threshold, other effects on performance may be deemed tolerable. For example, if the operator has set an objective to maximize total data throughput for cell 10 it may be determined that other performance indicators or indices may not be of lesser priority. Accordingly, if as per the present example, total data throughput remains above a certain threshold, it may not be necessary to assess the effects of a handoff threshold adjustment vis-à-vis other possible performance indicators or indices. However, if, as per the example, total data throughput does not remain above a certain threshold, then the other, lower priority, performance indicator or index may be used to assess the effects of handoff threshold reduction.

Accordingly, process 202 may be generally functionally similar to process 201, with the exception of step 231. After step 20, threshold adjuster 110 may compare the current performance as monitored by performance monitor 115 to an upper performance threshold for a first performance indicator or index (step 231). If the current performance exceeds the upper performance threshold, control may flow to step 250. Otherwise, step 232 may be executed and processing may continue as in process 201.

It will be appreciated by those of skill in the art that the order of the steps of processes 200, 201 and 202 may be exemplary; other processing flows providing generally the same functionality may also be supported by embodiments of the disclosure. Particularly, steps 230 and 240 and/or step 232, 241, 246 and/or 247 may be re-ordered within the scope of the embodiments of the disclosure. It will similarly be appreciated that processes 201 and 202 may be configured to support additional performance indicators or indices in the assessment of the effect of the handoff threshold adjustment, i.e., three or more performance indicators or indices may be used in the assessment. It will furthermore be appreciated that two or more performance indicators may be used to derive a single performance index for use in processes 200, 201 and/or 202. For example, total data throughput for a given period may be divided by a connection drop rate to provide an effective data throughput performance index which may then be used to assess the effect of a handoff threshold adjustment.

It will also be appreciated that processes 200, 201 and 202 are performed on individual cell controllers 100. Accordingly, each individual cell controller 100 so adjusted in a given mobile network may be adjusted independently of each other. However, it will be appreciated by one of skill in the art, that it may not be necessary to adjust each cell controller 100 in a mobile network in order to improve overall performance of the mobile network. Handoff thresholds in one cell 10 may affect the performance of neighboring cells 10, particularly, but not necessarily, if the associated secondary RAT is associated with a non-identical coverage area.

It will be appreciated by one of skill in the art that cell controllers 100 may typically be configured with performance counters that track network performance for a given cell 10. Such counters may be aggregated by proprietary or third-party self-optimizing network (SON) tools to derive aggregated performance indicators representing an overall network performance view. Per such aggregated performance indicators, it has been observed through field testing that even if only 20% of a mobile network's cell controllers 100 are adjusted using processes 200, 201 and/or 202, overall performance for the entire mobile network may be improved.

While the embodiments described hereinabove have generally focused on performance conditions and/or thresholds associated with the primary RAT, it will be appreciated by one of ordinary skill in the art that the performance of the secondary RAT may typically be inversely affected by actions performed in association with the primary RAT. For example, as the handoff threshold is lowered and the load on the primary RAT increases, the performance in the secondary RAT may improve as its load decreases. Similarly, if the handoff threshold for the primary RAT is raised, the load on the secondary RAT may increase and its performance may worsen, possibly to unacceptable levels. It will therefore be appreciated that the methods described hereinabove may also be implemented in terms of a adjusting a handoff threshold to improve performance for the secondary RAT as well.

It will also be appreciated that while the embodiments described hereinabove have generally referred to active mobile communication devices 15, i.e., devices actively engaging in call activity in cell 10, alternatively or in addition, the methods described hereinabove may also be applied to idle mobile communication devices 15, i.e., devices in cell 10 that are passively connected to the mobile network without actively engaging in calling activity.

It is appreciated that software components of the embodiments of the disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the disclosure.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable subcombination.

It will be appreciated by persons skilled in the art that the embodiments of the disclosure are not limited by what has been particularly shown and described hereinabove. Rather the scope of the embodiments of the disclosure is defined by the appended claims and equivalents thereof:

What is claimed is:

1. A method for improving overall performance in a mobile communication network, the method implemented on each mobile communication cell controller in a multiplicity of mobile communication controllers in said mobile communication network and comprising:
    periodically adjusting said RAT handoff threshold for a cell associated with said each mobile communication cell controller, wherein said multiplicity of mobile communication cell controllers is at least 20% of said mobile communication cell controllers in said mobile communication network, and wherein said RAT handoff threshold indicates a threshold according to which mobile communication devices using a primary RAT in said cell are handed off by said each mobile communication cell controller to a secondary cell controller using a secondary RAT;
    determining an effect of said adjusting on communication performance in said cell by monitoring at least one performance indicator associated with communication performance in said cell;
    upon determining that said at least one performance indicator is below a lower performance threshold, reversing said adjusting;
    upon determining that said at least one performance indicator is below an upper performance threshold, responsively performing corrective action for targeted mobile communication devices whose associated performance is between said upper and lower performance thresholds as per said monitoring, wherein said corrective action comprises increasing power for connections associated with said targeted mobile communication devices;
    handing off to said secondary RAT said mobile communication devices whose associated performance is below said handoff threshold; and
    setting a timer for a next action to be performed, wherein said next action to be performed is either said adjusting or said monitoring.

2. The method according to claim 1 and also comprising:
    monitoring at least one second performance indicator associated with communication performance in said cell;
    upon determining that said at least one performance indicator is above a lower performance threshold, and said at least one second performance indicator is below a second said lower performance threshold, reversing said adjusting;
    otherwise, upon determining that said at least one performance indicator is above an upper performance threshold, and said at least one second performance indicator is below a second said upper performance threshold, performing said corrective action for said targeted mobile communication devices whose associated performance is between said second upper and lower performance thresholds.

3. The method according to claim 1 wherein said monitoring comprises monitoring for at least one configurable period of time.

4. The method according to claim 1 wherein said monitoring comprises monitoring for two configurable periods of time, wherein:
    one of said two configurable periods of time is used to monitor said at least one performance indicator to evaluate whether said at least one performance indicator is below said lower performance threshold; and
    another of said two configurable periods of time is used to monitor said at least one performance indicator to evaluate whether said at least one performance indicator is below said upper performance threshold.

5. The method according to claim 1 and wherein:
    said primary RAT is LTE; and
    said secondary RAT is UMTS.

6. The method according to claim 1 and wherein:
    said primary RAT is LTE; and
    said secondary RAT is GSM.

7. The method according to claim 1 and wherein:
    said primary RAT is UMTS; and
    said secondary RAT is GSM.

8. The method according to claim 1 wherein said at least one performance indicator is reference signal received power (RSRP).

9. The method according to claim 1 wherein said at least one performance indicator is reference signal received quality (RSRQ).

10. The method according to claim 1 wherein a coverage area for said cell corresponds to a coverage area for a secondary RAT cell serviced by said secondary cell controller.

11. The method according to claim 1 wherein a coverage area for said cell partially overlaps a coverage area for a secondary RAT cell serviced by said secondary cell controller.

12. The method according to claim 1 wherein more than one said secondary cell controller is available for said handing off by said mobile communication cell controller.

13. A method for improving overall performance in a mobile communication network, the method implemented on each mobile communication cell controller in a multiplicity of mobile communication controllers in said mobile communication network and comprising:
periodically adjusting said handoff threshold for a cell associated with said each mobile communication cell controller, wherein said multiplicity of mobile communication cell controllers is at least 20% of said mobile communication cell controllers in said mobile communication network, wherein said handoff threshold indicates a threshold according to which mobile communication devices using a primary radio access technology (RAT) in said cell are handed off by said each mobile communication cell controller to a secondary cell controller using a secondary RAT, wherein a coverage area for said cell corresponds to a coverage area for a secondary RAT cell serviced by said secondary cell controller, and said secondary cell controller is one of at least two secondary cell controllers available for said handing off by said each mobile communication cell controller;
determining an effect of said adjusting on communication performance in said cell by monitoring at least two performance indicators associated with communication performance in said cell, wherein one of said at least two performance indicators is a priority performance indicator and at least one of said at least two performance indicators is a non-priority performance indicator;
upon determining that said priority performance indicator is below a lower priority performance threshold for said priority performance indicator, reversing said adjusting;
upon determining that said priority performance indicator is below an upper priority performance threshold for said priority performance indicator, responsively performing corrective action for targeted mobile communication devices whose associated performance is between said upper and lower priority performance thresholds as per said monitoring, wherein said corrective action comprises increasing power for connections associated with said targeted mobile communication devices;
upon determining that said priority performance indicator is below said upper priority performance threshold for said priority performance indicator, and said non-priority performance indicator is below a lower non-priority performance threshold for said priority performance indicator, reversing said adjusting;
handing off to said secondary RAT said mobile communication devices whose associated performance is below said handoff threshold; and
setting a timer for a next action to be performed, wherein said next action to be performed is either said adjusting or said monitoring.

14. The method according to claim 13 wherein said at least two performance indicators are RSRP and RSRQ.

15. The method according to claim 13 wherein said priority performance indicator is a measure of aggregate data throughput.

16. A self optimizing mobile communication network comprising:
a multiplicity of cells in said mobile communication network, wherein said multiplicity of cells represents at least 20% of all cells in said mobile communication network;
a multiplicity of mobile cell controllers, wherein each mobile cell controller in said multiplicity of mobile cell controllers is associated with one of said multiplicity of cells, wherein said each mobile cell controller is configured to improve overall performance for said self optimizing mobile communication network by periodically adjusting a handoff threshold for each of said multiplicity of cells, wherein said handoff threshold indicates a threshold according to which mobile communication devices using a primary radio access technology (RAT) in said multiplicity of cells are handed off by a primary cell controller to a secondary cell controller using a secondary RAT;
at least one performance monitor configured to monitor at least one performance indicator associated with communication performance in each cell in said multiplicity of cells; and
at least one performance adjuster configured to use said at least one performance indicator for said each cell to determine an effect of an adjustment of said handoff threshold for said each cell, and for said each cell in said multiplicity of cells:
upon determining that said at least one performance indicator is below a lower performance threshold, reverse said adjustment of said handoff threshold for said cell,
upon determining that said at least one performance indicator is below an upper performance threshold, responsively perform corrective action for targeted mobile communication devices in said each cell whose associated performance is between said upper and lower performance thresholds as per said performance monitor, wherein said corrective action comprises increasing power for connections associated with said selected mobile communication devices,
instruct said primary cell controller to hand off to said secondary cell controller any of said mobile communication devices whose associated performance is below said handoff threshold, and
set a timer for a next action to be performed, wherein said next action to be performed is to be performed by either said mobile cell controller or said performance monitor.

17. The mobile communication network according to claim 16 wherein a coverage area serviced by said primary cell controller corresponds to a coverage area serviced by said secondary cell controller.

18. The mobile communication network according to claim 16 wherein a coverage area serviced by said primary cell controller is partially overlapped by a coverage area serviced by said secondary cell controller.

19. The mobile communication network according to claim 16 wherein more than one said secondary cell controller is available for said handing off by said primary cell controller.

* * * * *

UNITED STATES PATENT AND TRADEMARK OFFICE
CERTIFICATE OF CORRECTION

PATENT NO. : 10,009,807 B2
APPLICATION NO. : 14/604815
DATED : June 26, 2018
INVENTOR(S) : Alon Ben Ami et al.

Page 1 of 1

It is certified that error appears in the above-identified patent and that said Letters Patent is hereby corrected as shown below:

In the Claims

Claim 16, Column 12, Line 47, please replace "in said each cell" with --in said cell--

Signed and Sealed this
Twenty-ninth Day of January, 2019

Andrei Iancu
*Director of the United States Patent and Trademark Office*